United States Patent [19]

Mauric

[11] Patent Number: 5,318,363
[45] Date of Patent: Jun. 7, 1994

[54] IMMERSION WELL CONSTRUCTION

[76] Inventor: Stanley Mauric, 1210 Roundhill Rd., Baltimore, Md. 21218

[21] Appl. No.: 31,108

[22] Filed: Mar. 12, 1993

Related U.S. Application Data

[62] Division of Ser. No. 615,623, Nov. 19, 1990, Pat. No. 5,199,789.

[51] Int. Cl.$^5$ .......................... G01K 1/14; G01K 5/32
[52] U.S. Cl. ............................. 374/208; 174/70 R; 236/DIG. 11; 374/142
[58] Field of Search ............ 374/143, 208, 163, 166, 374/189, 165, 187, 137, 101, 708, 142; 338/22 R, 28; 236/DIG. 11; 73/431; 174/151, 152 R, 70 R

[56] References Cited

U.S. PATENT DOCUMENTS

| | | |
|---|---|---|
| 1,775,682 | 9/1930 | Martin . |
| 2,015,838 | 10/1935 | Borden et al. . |
| 2,161,432 | 6/1939 | Ross . |
| 2,218,622 | 10/1940 | Rabezzana . |
| 2,494,628 | 1/1950 | Oberding . |
| 2,547,875 | 4/1951 | Krasnow . |
| 2,799,758 | 7/1957 | Hutchins . |
| 2,852,652 | 9/1958 | Rose et al. ............. 374/208 X |
| 2,937,354 | 5/1960 | Mazzarella et al. ......... 338/22 R |
| 3,016,746 | 1/1962 | Holloway . |
| 3,081,631 | 3/1963 | Switzer, Jr. et al. . |
| 3,122,728 | 2/1964 | Lindberg, Jr. . |
| 3,143,439 | 8/1964 | Hansen .................... 374/208 X |
| 3,154,947 | 11/1964 | Poshadel et al. . |
| 3,281,518 | 10/1966 | Stroud et al. . |
| 3,435,400 | 3/1969 | Beckman . |
| 3,439,356 | 4/1969 | Kinzer . |
| 3,596,518 | 8/1971 | Kirkpatrick . |
| 3,713,339 | 1/1973 | Medlar . |
| 3,765,242 | 10/1973 | Bailleu . |
| 3,923,552 | 12/1975 | Parris . |
| 3,955,419 | 5/1976 | Barton et al. . |
| 4,411,535 | 10/1983 | Schwargschild ............ 374/208 X |
| 4,548,517 | 10/1985 | Kampmann . |
| 4,560,973 | 12/1985 | Grimm et al. . |
| 4,575,705 | 3/1986 | Gotcher ................... 374/183 X |
| 4,772,132 | 9/1988 | Hofmann . |
| 4,830,515 | 5/1989 | Cortes . |
| 4,886,371 | 12/1989 | Fondin . |
| 4,958,938 | 9/1990 | Schwartz et al. . |
| 5,035,514 | 7/1991 | Newman . |
| 5,199,789 | 4/1993 | Mauric . |

OTHER PUBLICATIONS

Tech Tip, Johnson Controls, vol. 2, No. 3, 1990.
Hydronic Controls, p. 314, Honeywell Tradeline Catalog 1985.
Hydronic Controls, pp. 320–322, Honeywell Tradeline Catalog 1985.
Trerice, Bimetal Thermometers, Catalog 121, pp. 3–12, Jan. 1987.
Trerice, Industrial Thermometers, Catalog 110, pp. 110-3–110-11, Nov. 1986.
Weiss, Bi-Metal Thermometers, Catalog BM-280, pp. 2–7, Feb. 1980.
Conax, Temperature Sensors and Assemblies seals for Wires and Probes, Catalogs 5000, pp. 1–45, Apr. 1988.
Weiss Industrail Thermometers Industrial Glass Catalog 997B, pp. 1–12, Oct. 1985.
Remote Bulb Temperature Controls, p. 233, Honeywell Tradeline Catalog 1985.
Hydronic Controls, pp. 312–313, Honeywell Tradeline Catalog 1985.
Remote Bulb Temperature Controls, p. 226, Honeywell Tradeline Catalog 1985.

*Primary Examiner*—Daniel M. Yasich
*Attorney, Agent, or Firm*—Banner, Birch, McKie & Beckett

[57] ABSTRACT

An immersion well construction including a rigid, heat conductive elongate member having (a) a threaded outside surface portion for threading into a preexisting fluid vessel wall threaded opening, (b) a wrench flat portion disposed proximally of the threaded outside surface portion and (c) a longitudinally extending cavity. The cavity has a main cavity body portion and an adjacent and smaller diameter distal cavity pocket. An inwardly disposed groove is formed on and extends longitudinally along the cavity, such that one or more wires of an electrical sensor held in the cavity pocket can pass in and along the groove and out the elongate member and to an electrical system, such as a remote computer control system.

23 Claims, 4 Drawing Sheets

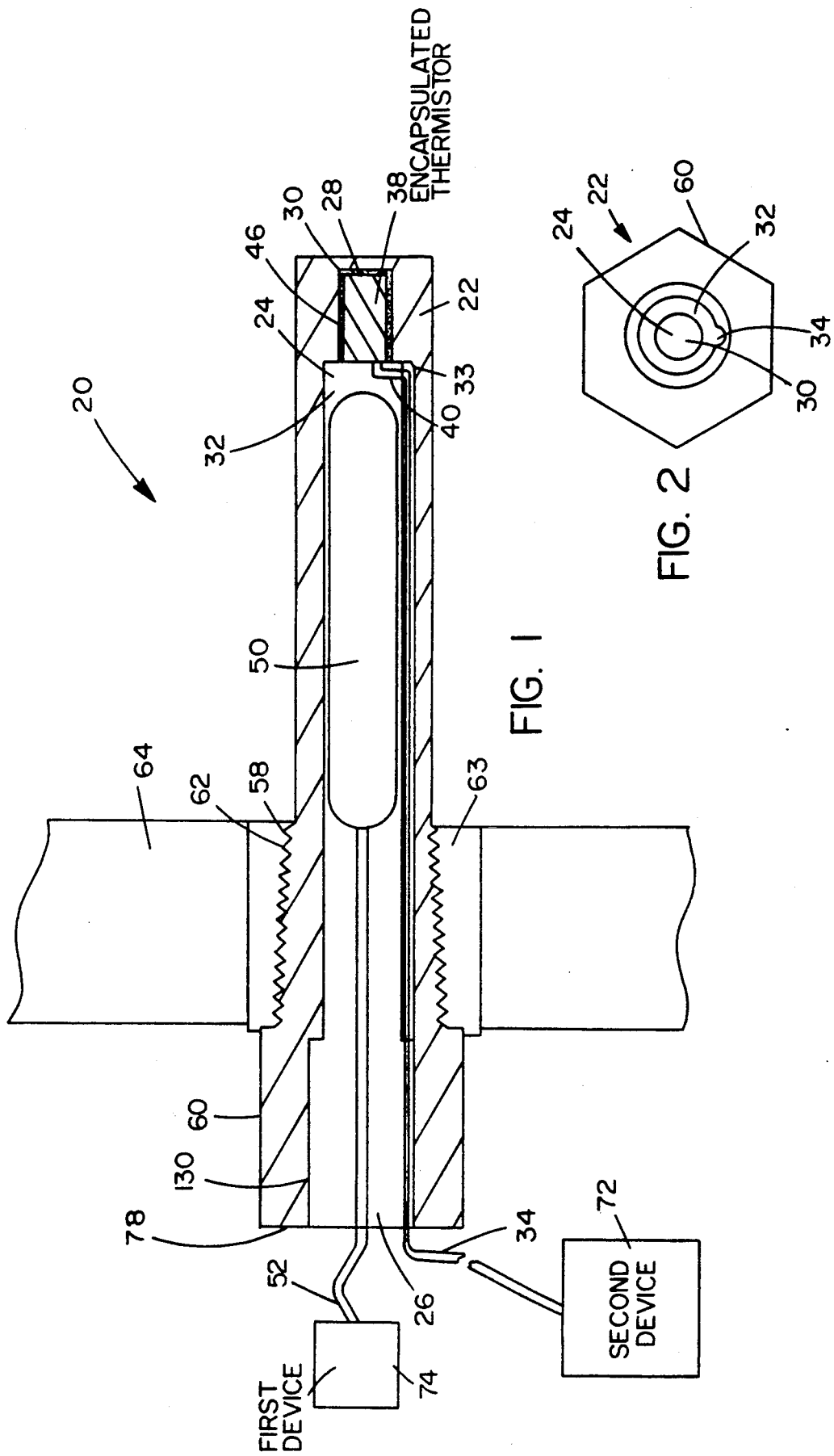

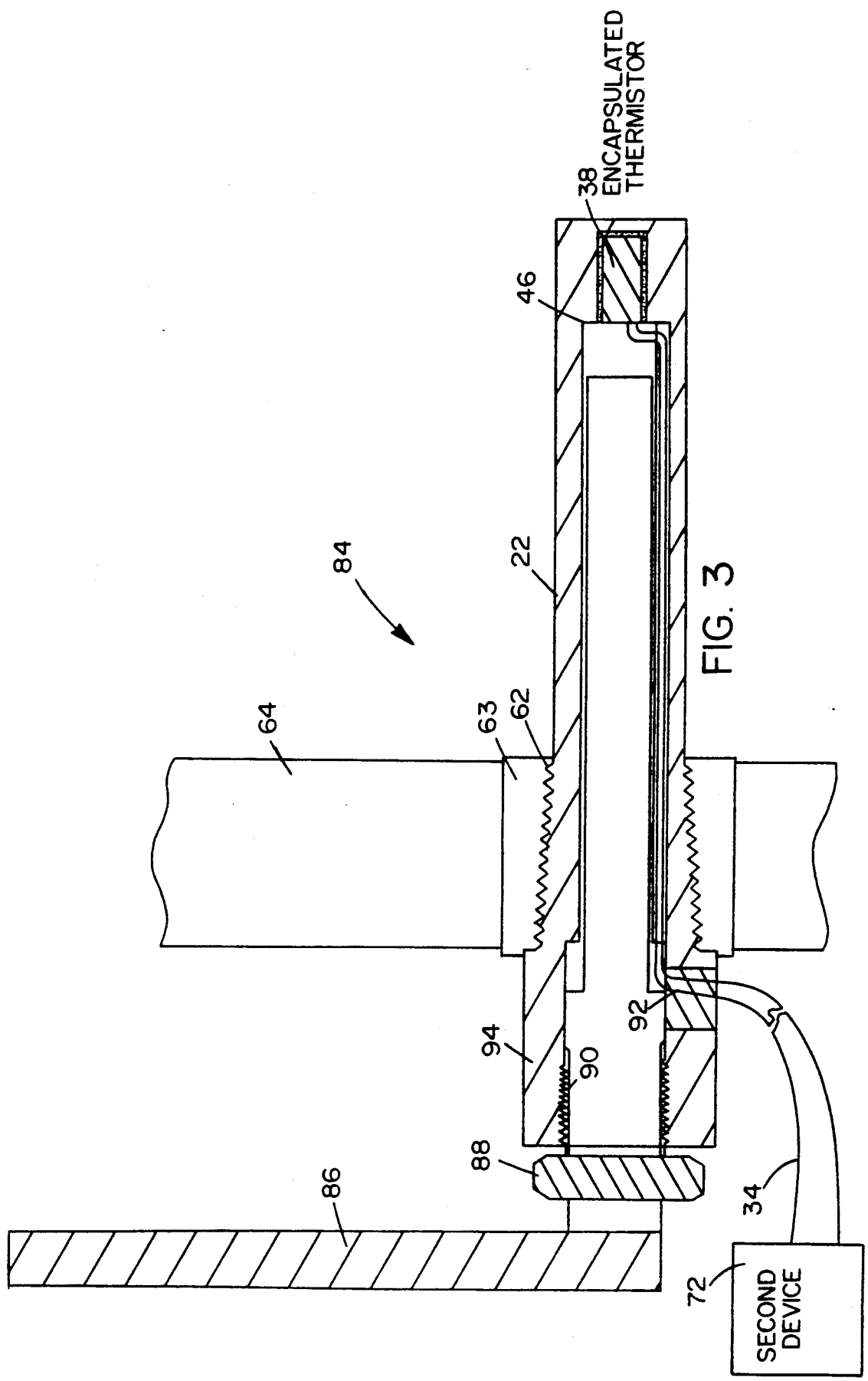

IMMERSION WELL CONSTRUCTION

CROSS REFERENCE TO RELATED APPLICATION

This is a division of copending application Ser. No. 07/615,623, filed Nov. 19, 1990, and which issued Apr. 6, 1993 as U.S. Pat. No. 5,199,789.

BACKGROUND OF THE INVENTION

The present invention relates to immersion wells used in boilers, hot water heaters and other fluid vessels. It more particularly relates to such immersion wells which house mechanical temperature sensors. It further relates to constructions of electronic temperature sensing and computer control or display systems for hot (or cold) fluid vessels.

It is often desirable to further control or automate an existing boiler or hot ,water system to make it more efficient and thus less expensive to run. Some type of (usually mechanical) temperature sensor is already provided on these vessels to control the burners when the temperature of the fluid in the vessel reaches a predetermined temperature. These systems typically are simple on/off systems and turn the burner on and off when the water reaches certain temperatures. There are three common ways of attaching the electronic sensor to an existing vessel to obtain a temperature indication for the control equipment to make the system more efficient.

One method is to burn a hole into the tank, weld a fitting at the hole, and thread the sensor housing into the fitting. As an example, a welder takes a Weld-o-let, which is a piece of metal or steel with a threaded interior, places it on top of the opening and then welds around it making an effective attachment and seal. This procedure is rather time-consuming and expensive, however, and requires special welding skills and workman certifications.

Another method is to strap a sensor onto a piping or other portion of the fluid system. Often the pipe is insulated so the insulation must first be removed according to this method, the exposed surface of the pipe cleaned, a heat transmitting paste applied thereon, the sensor stuck in the paste, a strap placed around the entire pipe circumference clamping the sensor down and the insulation then replaced. It is thus the temperature of the surface of the pipe which is then sensed and not necessarily that of the fluid in the pipe. This surface temperature can not only differ from but also lag that of the fluid inside of the pipe at that location. Another disadvantage is that often the strapped-on sensor often is not and cannot be placed at the preferred location on the vessel near the strata of fluid whose temperature is preferably to be determined.

A third method of applying the electronic temperature sensor to an existing vessel is to insert it into an unused preexisting tapping. These tappings usually are not present, however, and when they are, they are often corroded shut.

SUMMARY OF THE INVENTION

Accordingly, it is a principal object of the present invention to provide an improved system for placing an electronic temperature sensor on an existing fluid vessel, which system accurately and quickly senses the temperature at the desired location in the fluid and which system can be installed quickly and relatively inexpensively.

Directed to achieving this object, an improved method for installing an electronic control system on a hot water vessel is herein provided. An existing well having a mechanical sensor is unthreaded from the vessel wall and an immersion well of the present invention is threaded into that vessel opening. This well comprises a tube having a longitudinal cavity with a small pocket at its distal end. An encapsulated thermistor surrounded by heat conductive paste is positioned in the pocket. The thermistor wire travels in a cavity wall groove and out the other end of the tube. A capillary bulb or other mechanical sensor is positioned in the cavity along the groove. The bulb is operatively connected to a first device such as a burner control or a thermometer. The thermistor in turn and through its wires is connected to a second device such as a computer control system or a local, digital temperature display. The thermistor is thus mounted in the desired place within the vessel fluid and without an additional vessel wall opening being needed to be formed.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a cross sectional view of a first immersion well assembly of the present invention shown threaded in position in a vessel well.

FIG. 2 is an end elevational view of the tube member of the assembly of FIG. 1 illustrated in isolation.

FIG. 3 is a cross sectional view of a second immersion well assembly of the present invention shown threaded into place in a yessel wall.

DETAILED DESCRIPTION OF PREFERRED EMBODIMENTS OF THE INVENTION

Figure 4:
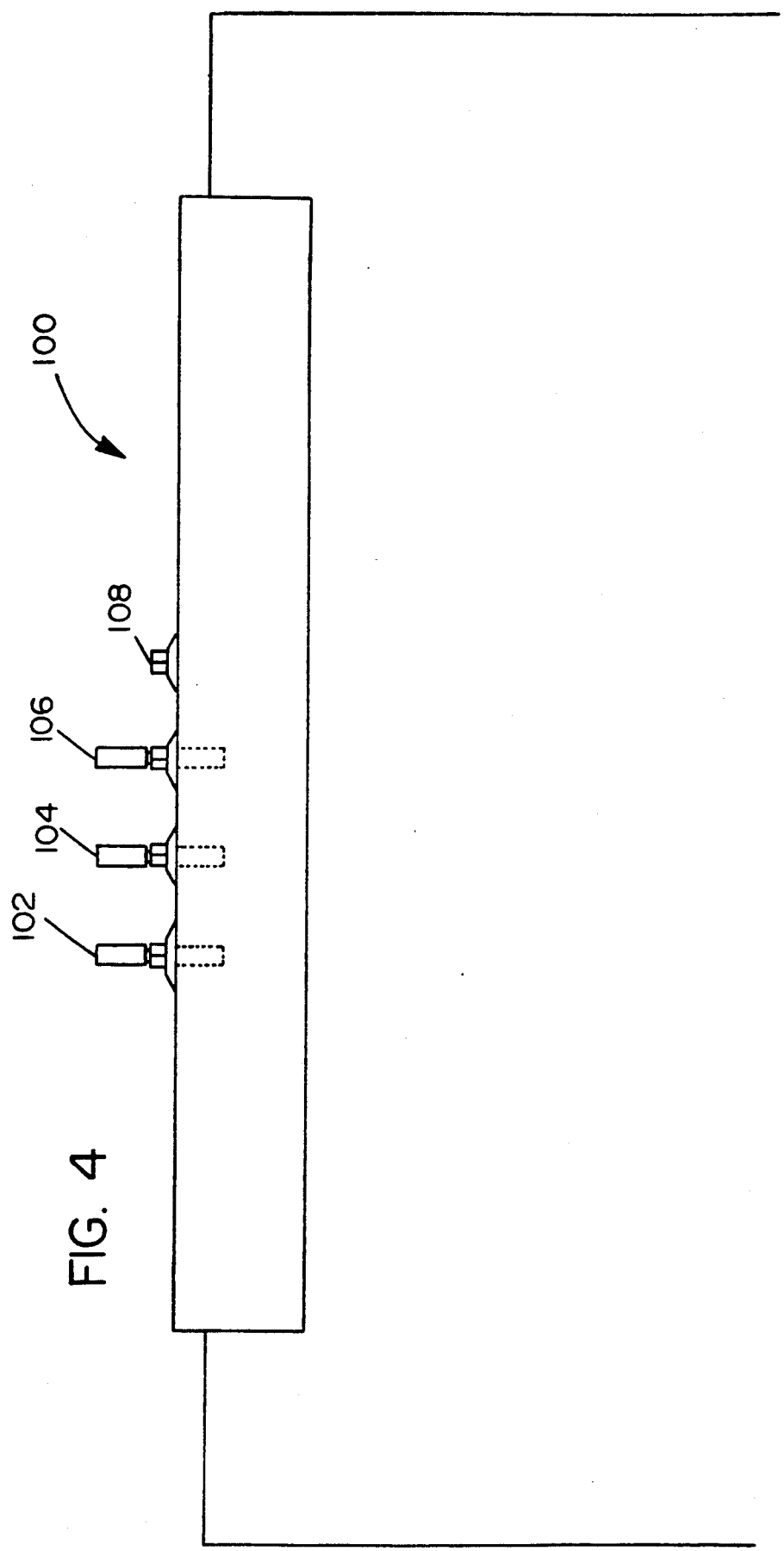
FIG. 4 is a top plan view of a portion of a boiler using the immersion well assembly of FIG. 1.

Referring to FIG. 1 a first immersion well assembly of the present invention is illustrated generally at 20. This assembly 20 is shown to comprise a metal tube 22, whose manufacture will be described in detail later, defining a cavity 24 therewithin having an open end 26 and a closed end 28. A small (narrower diameter) pocket 30 is formed in the distal closed end 28 of the cavity 24. The main body 32 of the cavity 24 then extends substantially the rest of the length of the tube 22. A groove or half round 33 is formed the length of the main body cavity 22. The various diameters of the cavity 24 of the tube are best shown in the end view of FIG. 2.

An electronic sensor (or more generally a device having an output, such as a signal output) is positioned in the pocket 30, and its wires (or electrical conduits) 34 extend along the groove 33. The wires 34 can be formed rigid along the groove portion to facilitate placement thereof in the groove 33. Adhesives can be used on the wire 34 and/or in the groove 33 to hold them therein. The electronic sensor 38 comprises a thermistor encapsulated in a small diameter tube epoxied at both ends, as is commercially available from others, and held with heat conductive paste 46 in the pocket 30.

In other words, disclosed herein is an immersion well assembly for a fluid vessel, such as a boiler, hot water heater or piping system, having an existing threaded opening. A preexisting well housing a mechanical temperature sensor, which is operatively connected to a temperature display or control first system, is removed from the opening, and the present immersion well assembly is threaded therein. In this assembly are a (replacement) mechanical sensor to be connected to the first system and an electronic sensor. The electronic sensor is positioned in a small distal pocket of the sensor and the sensor wire(s) travel along a groove adjacent the mechanical sensor and out to a second system, such as a remote computer control system. A copper thermometer bulb or other mechanical temperature sensor 50 is another device having an output signal, and is disposed in the main body portion 32 of the cavity 24. The bulb 50 typically has refrigerant gas in it, and a small copper tube 52 extending out from the bulb is connected to a switch. The switch has a dial which can be set to the desired temperature, such as 140° F., and with an adjustable variance of 10° for example. Thus, when the indicated temperature drops to 130°, the circuit is activated and kept running until it reaches 140° when it is then turned off. In lieu of or addition to the groove 33 a corresponding wire groove can be provided, formed on and along the bulb 50.

A threaded portion 58 is formed on the outer circumference of the tube 52 and wrench flats 60 provided at the proximal end of the tube adjacent the threaded portion. With the distal or closed end 28 inserted into a pre-existing threaded opening 62 through a vessel portion 63 of the vessel wall 64, a wrench (not shown) is placed on the wrench flats 60, the wrench turned and the threaded portion 58 thereby threaded into the opening to secure the assembly 20 in the wall opening. The fluid in the vessel (64) can be any type of fluid—cold or hot; it can be a liquid, a gas or even a volume of flowable particulate matter, such as beads or grain.

Figure 5:
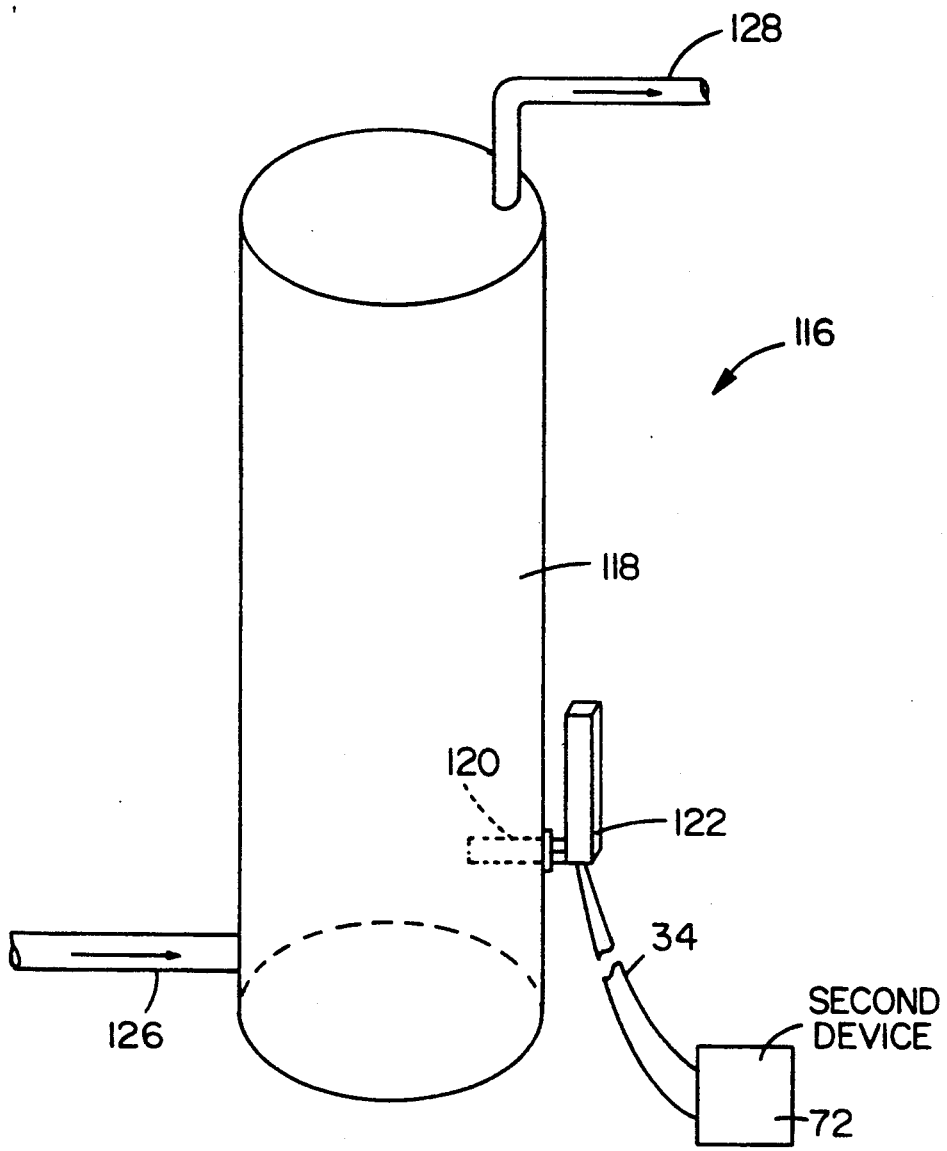
FIG. 5 is a perspective view of a hot water heater or storage tank using the immersion well assembly of FIG. 3.

The wires 34 from the electronic sensor 38 are connected to a control system or local or remote display shown generically by a second device 72. An example of a controller or control system 72 is the domestic hot water controller available from Protemp Fluidmaster of California, The bulb 50 with refrigerant gas therein is connected by the copper capillary tube 52 to an existing control such as a switch by a first device shown generically at 74, which can be mounted remotely or on the well, and can for example include a pneumatic controller. When mounted on the well it can be mounted on the surface 78. This surface 78 can be flat, as shown, or can be machined to accept the mounting hardware of the existing control (74). The existing control or first device 74 is wired so that it still operates the system in the event the computer of control 72 fails. For example, if a temperature of 140° in the system is the maximum desired temperature then the existing control 74 can be set at 145°. The existing control 74 then operates the system, and this control is broken with another relay that is controlled by the computer control 72. When applied to a piping system it is often necessary to drain the entire building down; that is, all the water in the system. In contrast, when the assembly is to be positioned in a boiler only the boiler needs to be drained down since it usually can be isolated. Although FIG. 5 shows a sectional hot water heater 100, the (three or four) openings 102, 104, 106, 108 can also be located in the side of a round boiler or a boiler having a square cover.

FIG. 3 shows generally at 84 another embodiment of the immersion well assembly of the present invention wherein the mechanical sensor 50 is attached to a local visual thermometer 86 (which comprises the first device 74), such as are often found on boiler room pipes. Examples of thermometers 86 are those manufactured by H. O. Trerice Co. of Detroit, Mich., and shown in its Catalog Nos. 121 and 110, and those manufactured by Weiss Instruments, Inc. of West Babylon, N.Y., and as shown in its Catalog No. 977B on page 3 and in Catalog No. BM-280. This thermometer 86, which includes a securing nut 88, is secured to the tube 22 by threading it into the interior threaded portions 90 at the end of the tube. Since the threaded portions 90 are along the wall of the cavity 24, the wires 34 from the electronic sensor 38 cannot travel therealong as they would be crushed and torn when the thermometer assembly is threaded into the tube 22. Accordingly, small holes 92 are drilled into the end head portion 94 of the tube 22 and a small slot is milled out through which the wires 34 pass. The sensor 38 can be a thermistor, as previously stated, that puts out a certain resistance value at various temperatures. There are a number of different kinds of thermistors commercially available which can be used with this system including those available from Protemp, Andover and Johnson Controls Computer. The wires from this sensor 38 are then connected to the computer or local or remote display device 72. The existing thermometer sensing vessel 96 (50) is shown positioned in the cavity 24 directly behind the sensor 38. The present well assembly replaces the existing stationary well in this thermometer embodiment.

FIG. 4 shows a boiler 100 having three controls with an immersion well assembly 20 in one them and an additional tapped hole 108 which is often plugged or corroded shut. Often larger boilers have three controls—one is the operating control which turns it on, a second is a modulating fire controller and the third is a manual-rest high limit safety. When the boiler first turns on, the operating controls close. The boiler then goes through its purge cycle clearing the chamber of combustion gases. If it has a modulating fire capability it goes into low fire, lights off, all the safeties check out making sure that it is running correctly and then it goes into high fire. An example of an existing modulating fire control is the Honeywell Model No. T991A. If the operating control is set at 180° F. and the modulating fire controller is set at 175° the boiler will come on at 170°. The modulating fire control will attempt to reduce the firing rate of the boiler to try to maintain that temperature (175° F.). If it is at 170° after it goes through all of the safeties then the modulating fire controller sends a signal to the burner to be at full output. As the temperature approaches this setting, it will then slowly throttle the boiler down. If the load is equal to the point the burner is at then it will run continually at 175°, assuming The load that is being taken off the boiler is equal to what is being put in. If it is at low fire and the temperature is still increasing, then more heat is being put into the boiler than is being taken out and when it reaches 180° it will shut off. In other words, as soon as the operating control reaches 180° the boiler 100 shuts off and the entire sequence starts again. Thus, energy management computer control systems such as control 72 are often now used to take over the function of the modulating fire control 104. These systems prevent a boiler which is in high fire from being shut off, which is a preferred operating strategy.

The immersion well assembly 20 of the present invention would be placed in either the operating controller opening 102 or the modulating fire control opening 104 and not in the manual high limit safety reset 106, which is not to be tampered with. If the temperature rises to the safety reset temperature then the boiler 100 is locked out and a button (not shown) must be physically pushed to get the system started again. Thus, the assembly (20, 84) of the present invention is placed in one of the two day-to-day operating controls 102 or 104 and not in the ultimate safety control 106. The safety control 106 might be set at 240° while the operating control is set at 180°, so that when the temperature reaches 240° the boiler is shut down and someone must determine why the operating controls did not function.

An example of a boiler 100 is the H B Smith Boiler having three predrilled, pretapped holes 102, 104, 106, such as three quarter inch National Pipe Threads. One control is a manual high limit preset 106, the second is the operating control 104, which puts out a resistance which a modulating motor attempts to match, and the third is the modulating fire control 102. Occasionally a fourth plugged hole 108 is provided in the boiler 100, but as previously stated the plug after time often cannot be removed therefrom as it and the surrounding Weld-o-let have rusted together. An example of an operating control 102 is the L6048 available from Honeywell. Examples of remote prior art controls 102 typically found in boilers and tanks and usable herein are the Honeywell L400 8A, B, E, and the L600 8A remote bulb controllers, the Honeywell L400 6A, B, E, and L600 6A, B, C Aquastat Controllers.

FIG. 5 is a perspective view showing generally at 116 a water storage tank or water system of the invention. The cylindrical tank portion is shown by reference numeral 118, and an immersion well assembly 120 (20 or 84) of the present invention is shown installed in the tank 118. The existing control 122 (74 or 84) though shown mounted at the end of the tube could also be mounted remotely. The wires 34 from the sensor are similarly connected to a control computer or other local or remote display 72.

For a domestic hot water tank 118 the cold water comes in through a lower pipe 126 and hot water exits out a top pipe 128. Thus there will be some temperature stratification of the water within the tank 118. It is desirable to sense the temperature in the lower third of the tank in the area of the cold incoming water and thus that is where the present well is mounted. The square metal box sitting on the lower side of the hot water heater 118 has a dial whose temperature setting can be adjusted, as needed, with a screwdriver. The concept of the immersion well assembly of the present invention is thus essentially the same for both boilers and hot water heaters, though the temperature ranges therefor will typically differ.

The procedure for applying an electronic sensor 38 to an existing fluid vessel 64 is relatively easy pursuant to the present invention. The existing immersion well having a (mechanical) sensor therein is removed from its threaded opening 62 after the water has been sufficiently drained from the vessel 100, 118. An immersion well assembly 20 or 84 of the present invention is then threaded into place in this opening 62. After the sensor 38 has been placed in the pocket 30 and secured therein in heat conductive paste 46, the capillary tube or bulb 50 is positioned therein behind it. The thermal or heat conductive paste 46 prevents an insulating air gap between the sensor 38 and the surrounding metal pocket 30 from forming. The old control (74) associated with the bulb 50 is mounted back in place, and the wires 34 from the electronic sensor 38 are hooked up to the computer or control system 72. This assembly thus has not only the same or a replacement mechanical sensor 50 but also the new electronic sensor 38 therein. The sensor 38 and wires 34 can thus be positioned in the pocket 30 after the tube 22 via its threaded portion 58 has been threaded into the wall opening 62. Alternatively, the sensor 38 (and wire 34) can be first positioned (and held) in the pocket 30 and then the tube 22 threaded into position. In fact, the tube 22 and sensor 38 can be made and distributed as an assembled unit.

These sensors 38 are available from Protemp and Andover and can be obtained from a number of different suppliers. The sensor 38 is held in a quarter inch aluminum or stainless steel tube which is epoxied at both ends and the wires 34 exit the tube 22. The electronic sensor 38 creates a resistance value at a given temperature, and sends its signal fifty, 1,000 or 2,000 feet depending on where the brains of the computer 74 are located. The brains control another relay or switch which typically is aligned with the existing switch. This switch and the new relay which is to be controlled through the computer 74 are mounted in series. The existing switch is set a little higher than the maximum desired temperature. If the signal from the new system fails then the relay fails close and the control returns to the existing control 74.

Existing wells with capillary bulbs therein typically do not have sufficient room to insert an electronic sensor 38 therein. There is neither the pocket area for the sensor nor the space around the bulb out through which the sensor wires (34) can pass. Thus, it is desirable to manufacture a new tube (22) having the proper configuration and cavity diameters. A hexagonal or square stock brass, or stainless steel can be used for the tube 22. The end is machined off cylindrically, and the threads 58 are machined on. (An alternative method uses a cylindrical piece of metal and manufactures at least two spaced wrench flats 60 at the proximal end around and on which a wrench can grasp). The small pocket hole 28 is drilled through the substantial extent of the tube 22 and then a larger hole 24 is drilled down to the start of the pocket. The diameter of the large cavity portion 46 is preferable 0.390 inch. while that of the pocket 38 is 0.260 inch. By having the sensors 50, 28 arranged longitudinally, as opposed to laterally or side-by-side, the diameter of the tube 22 can be maintained at a usable, workable dimension. Then a third larger diameter hole 130 is drilled down to provide for insertion clearances. Using a guide reamer the half moon shaped groove 33 is drilled, or a shaper is used to slice the groove out. It is preferable nor to omit the groove 33 and simply make the diameter of the major cavity portion 32 larger since this would increase the existing air space between the bulb 50 and the cavity wall. The space between the bulb 50 and the cavity wall should be only sufficient so that the bulb can be slid into place in the cavity 24. Another construction procedure of this invention makes the tube 22 according to injection molding technologies.

This immersion well assembly 20 or 84 is thus used to sense temperature through an existing penetration 62 in a boiler, tank or piping system and the existing control or visual thermometer is left intact and operating. The present assembly senses temperature for two different devices 72 and 74; the first device 74 is an existing already present control and the second device 72 is some sort of computer. The temperature is being sensed electronically for the computer and mechanically for the existing control. The hot water controller 72 uses the information acquired from the electronic sensor 38 to more accurately monitor (or display) temperature and/or control the temperature of the water.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. An immersion well construction, comprising:
   a generally rigid, heat conductive, elongate probe member having (a) a threaded outside surface portion for threading into an opening in a wall of a fluid vessel, (b) a wrench flat portion disposed proximally of said threaded outside surface for engagement by a wrench for theading said threaded outside surface relative to the opening such that said elongate probe member is in an operative position relative to the vessel, and (c) a longitudinally extending cavity;
   said cavity including a main cavity body portion and a distal cavity pocket adjacent thereto;
   said cavity pocket, with said elongate probe member in the operative position, being disposed inside of the vessel;
   said cavity pocket being configured and dimensioned for housing generally therein a first device having a signal output, with said elongate probe member in the operative position, and at least one conduit for conveying the signal output to another location generally outside of the vessel;
   said main cavity body portion being configured and dimensioned for housing therein a second device; and
   said elongate probe member having a inwardly disposed groove formed on and extending longitudinally along a wall of said cavity portion and in which at least a portion of the conduit of the first device, when housed in said cavity pocket, can extend to pass generally along the second device when housed in said main cavity body portion and generally out of said elongate probe member.

2. The construction of claim 1 wherein said cavity pocket has a maximum diameter different than the maximum diameter of said main cavity body portion.

3. The construction of claim 2 wherein the cavity pocket diameter is less than the main cavity body portion diameter.

4. The construction of claim 1 wherein the first device is a sensor for sensing a temperature of fluid in the vessel when said elongate probe member is in the operative position, and the conduit is a sensor wire for the sensor.

5. The construction of claim 1 wherein said elongate probe member is formed from a rigid metal part and said distal cavity pocket is drill-formed in said metal part before said main cavity body portion is drill-formed in said metal part.

6. The construction of claim 1 wherein said distal cavity pocket is substantially shorter in a longitudinal direction than is said main cavity body portion.

7. The construction of claim 1 wherein said distal cavity pocket is cylindrically shaped.

8. The construction of claim 1 wherein said main cavity body portion is configured and dimensioned to house therein, with a close cross-sectional fit, the second device.

9. The construction of claim 1 wherein said elongate probe member is constructed so that the conduit can pass out of a lateral radial opening in said elongate probe member and positioned proximal relative to said wrench flat portion.

10. The construction of claim 1 wherein said elongate probe member has a proximal end out through which said cavity passes and said elongate probe member is constructed so that the conduit can pass generally longitudinally out said proximal end.

11. The construction of claim 1 wherein the second device is a vessel fluid temperature sensor.

12. An immersion well construction comprising:
    a generally rigid, heat conductive, elongate probe member having a threaded outside surface portion for threading into an opening in a wall of a fluid vessel, a wrench flat portion disposed proximally of said threaded outside surface for engagement by a wrench for threading said threaded outside surface relative to the opening, and a longitudinally extending cavity;
    said cavity including a main cavity body portion and a distal cavity pocket generally adjacent thereto;
    said cavity pocket having a diameter less than the diameter of said main cavity body portion;
    said cavity pocket, with said threaded outside surface portion threaded into the opening, being disposed generally in the vessel;
    said cavity pocket being configured and dimensioned for housing generally therein a first device having a device output and having at least one conduit for conveying the device output to another location generally outside of the vessel;
    said main cavity body portion being configured and dimensioned for housing therein a second device; and
    said elongate probe member having an inwardly disposed groove formed on and extending longitudinally along a wall of said main cavity body portion and in which at least a part of the conduit of the first device, when the first device is housed in said cavity pocket, can generally pass out of said elongate probe member and generally along the second device when in said main cavity body portion.

13. The construction of claim 12 wherein said elongate probe member is formed in a machining process from at least one rigid material selected from the group of brass, stainless steel, monel and titanium.

14. The construction of claim 12 wherein said groove opens up along its length into said cavity.

15. The construction of claim 12 wherein said groove is drilled out of a wall of said cavity.

16. The construction of claim 12 wherein said groove is sliced out of a wall of said cavity.

17. The construction of claim 12 wherein the first device comprises a first sensor, the at least one conduit comprises at least one wire for the first sensor, the second device comprises a second sensor, and the at least one wire passes along the second sensor when housed in said main cavity body portion.

18. The construction of claim 17 wherein the first and second sensors both can measure temperatures of fluid in the fluid vessel with said threaded outside surface portion theaded into the opening.

19. The construction of claim 12 wherein said main cavity body portion and said cavity pocket are axially aligned, and said main cavity portion and said cavity pocket are both generally cylindrically shaped.

20. The construction of claim 12 wherein said elongate probe member has an end and an inner wall, and said cavity passes through said end and is formed at least in part by said inner wall.

21. The construction of claim 20 wherein the first device is a temperature sensor for sensing a temperature of fluid in the vessel, the at least one conduit is at least one temperature sensor wire, the second device is an elongate sensor, and said groove is dimensioned such that the at least one wire fits therein a sufficient amount so as to not interfere with the elongate sensor when positioned with a close cross-sectional fit in said main cavity body portion.

22. The construction of claim 12 wherein the device output is a signal output.

23. The construction of claim 12 wherein the at least one conduit comprises a pair of wires.

* * * * *